United States Patent [19]

Schmidt

[11] Patent Number: 4,611,614
[45] Date of Patent: Sep. 16, 1986

[54] APPARATUS FOR CLEANING PARTS OF PROCESSING MACHINES FROM RESIDUES

[75] Inventor: Rudolf Schmidt, Munich, Fed. Rep. of Germany

[73] Assignee: Caroline Christ, Fabrikation chemischer Erzeugnisse, Dachau, Fed. Rep. of Germany

[21] Appl. No.: 590,732

[22] Filed: Mar. 19, 1984

[30] Foreign Application Priority Data

Mar. 18, 1983 [DE] Fed. Rep. of Germany ....... 3309878

[51] Int. Cl.$^4$ ............................................... B08B 3/10
[52] U.S. Cl. ..................... 134/107; 134/120; 134/159; 134/187
[58] Field of Search .................. 134/83, 117, 93, 120, 134/105, 121, 107, 159, 135, 137, 143, 157, 187, 140

[56] References Cited

U.S. PATENT DOCUMENTS

| | | | |
|---|---|---|---|
| 574,516 | 1/1897 | Beeman | 134/105 X |
| 2,057,177 | 10/1936 | Wolff | 134/105 X |
| 2,165,497 | 7/1934 | Mickelsen | 134/120 X |
| 2,326,017 | 8/1943 | Doughty | 134/85 X |
| 2,627,015 | 1/1953 | Hackman | 134/105 X |
| 2,779,696 | 1/1957 | Rutherford, Jr. | 134/105 X |
| 2,902,181 | 9/1959 | Hauck | 134/83 X |
| 3,134,203 | 5/1964 | Roberts | 134/157 X |
| 3,613,699 | 10/1971 | Holm | 134/105 X |
| 3,770,501 | 11/1973 | Kemper | 134/85 X |
| 3,964,926 | 6/1976 | Westphal | 134/143 X |
| 4,053,280 | 10/1977 | Salisbury | 134/135 X |
| 4,117,855 | 10/1978 | Olcott et al. | 134/143 X |
| 4,173,493 | 11/1979 | Kallas | 134/107 X |
| 4,209,342 | 6/1980 | Workman | 134/104 X |
| 4,233,496 | 11/1980 | Weber et al. | 134/105 X |
| 4,331,230 | 5/1982 | Buckley | 134/83 |

FOREIGN PATENT DOCUMENTS 3146478 6/1983 Fed. Rep. of Germany .

Primary Examiner—Harvey C. Hornsby
Assistant Examiner—Frankie L. Stinson
Attorney, Agent, or Firm—Henry M. Feiereisen

[57] ABSTRACT

An apparatus for cleaning those parts of processing machines of synthetic materials on which synthetic residues adhere includes a container which receives the parts and is airtightly closable. This container is associated to a heating unit which heats a liquid carrier medium to a temperature above the melting point of the synthetic residues adhering to the parts to be cleaned therefrom. The container is tiltable around a horizontal axis between a horizontal charging position and a vertical operating position. Connected to the container is a tank which is located below the container when the apparatus is in the horizontal position, and which accommodates the heat carrier medium. Upon movement of the container and the tank from the horizontal position into the vertical position, the heat carrier medium flows into the container and upon reverse movement flows back into the tank. An overflow determines the maximum filling level of the heat carrier medium in the container. The apparatus is especially suitable for easy and economical cleaning of extrusion screws.

16 Claims, 3 Drawing Figures

APPARATUS FOR CLEANING PARTS OF PROCESSING MACHINES FROM RESIDUES

BACKGROUND OF THE INVENTION

The present invention relates to an apparatus for cleaning parts of processing machines, especially processing machines of synthetic materials, from residues, primarily synthetic residues which adhere to these parts.

From the DE-OS No. 31 46 478.5, there is known such an apparatus which is provided with an airtight closeable container and a heating device. A liquid heat carrier medium is provided within the container and can be heated up to a temperature above the melting point of the synthetic residues adhering to the parts of the processing machine. The container according to this reference is cup-shaped and equipped with a lid which airtightly seals the container against the atmosphere.

This principle seems to be sound, however, there are some disadvantages as the liquid heat carrier medium, depending on the shape and volume of the parts to be cleaned, must either be added to the container or a possible excess must be skimmed off. Furthermore, the apparatus according to the reference is obviously unsuitable in case especially bulky parts are to be cleaned, like e.g. extrusion screws, since the container must be made sufficiently deep in order to accomodate such parts which fact in turn requires the the parts be placed into the container only from atop. Finally such a container requires a large amount of heat carrier medium so that a substantial energy comsumption and a long cooling period are required.

SUMMARY OF THE INVENTION

It is a general object of the present invention to avoid the prior art disadvantages.

In particular, it is an object of the present invention to provide an apparatus for cleaning parts of a processing machine from residues, which apparatus allows the cleaning also of bulky parts in an easy, fast and most ecomonical manner. Yet another object of the invention is to provide an apparatus which is simple in construction and inexpensive to manufacture and nevertheless reliable in operation.

In keeping with these objects and with others which will become apparent hereinafter, one feature of the present invention resides, briefly stated, in an apparatus having a container which is connected to a tank in which the heat carrier medium is located. Both the container and the tank are accomodated in a housing which is movable from a horizontal charging position into a vertical operating position so that the heat carrier medium, upon tilting of the housing into the vertical position, flows from the tank into the container and upon tilting into the charging position flows back into the tank. This flowing behavior of the heat carrier medium is due to the fact that the tank is arranged at an angle with respect to the container. Preferably, the tank is arranged below the container, approximately at an angle of 90° with respect to the latter, when the housing is in its charging position.

By providing such an apparatus, it is possible to adjust the shape and volume of the container to the shape and volume of the largest part to be cleaned and to provide the container in an easily accessible manner when charging and discharging the parts to be cleaned as this can be carried out when the housing occupies its horizontal position. Consequently, the uncomfortable and difficult charging or discharging from atop the prior art apparatus is prevented. Moreover, the invention has the advantage that the tank can be filled with a predetermined maximum amount of heat carrier medium which automatically flows from the tank into the container when it is in its operating position and, after the cleaning process has been terminated, automatically returns into the tank when the housing is turned or tilted into its charging position.

According to a preferred embodiment of the present invention, the connection between the tank and the container is arranged above the maximum filling level of the heat carrier medium in the container when the housing is in its vertical position. Through such an arrangement, the formation of an alternatingly pressurized air cushion above the level of the heat carrier medium when the housing, and thus the container, occupies the vertical or operating position, and dependent upon the filling level within the container, is prevented. By simultaneous arrangement of the tank with respect to the container in such a manner that the connection therebetween is in the area of the lowest point of the tank, i.e. at an edge of the portion of the tank which is adjacent to the container, and by providing the connection between the tank and the container with a sufficient cross-section, the air displaced by the heat carrier medium during movement of the housing into the vertical position flows into the tank. Therefore the formation of an air pressure build-up is prevented.

It is suitable to provide a filter in the connection between the container and the tank in order to permit depositing of the separated and cooled synthetic residues thereon. When their specific gravity is smaller than that of the heat carrier medium, the residues will automatically ascend and deposit on the filter while otherwise the residues would be carried along by the heat carrier medium returning to the tank when moving the housing into the horizontal position.

To guaranty a continuously constant filling level regardless of the volume of the parts to be cleaned, it is preferable to provide an overflow at the level of the maximum filling level of the heat carrier medium within the container.

This overflow arrangement preferably connects the container with an overflow reservoir which is located above the container when the housing is in the horizontal position and is approximately coaxial with the container, i.e. slightly inclined with respect to the longitudinal axis of the housing so that the overflow reservoir will be completely emptied upon movement of the housing into the horizontal position.

An essential advantage of the present invention and thus of the applied cleaning principle resides in the fact that synthetic material will not be decomposed thereby preventing the formation of toxic or other gases noxious to the environment which would necessitate a stationary installation of the apparatus in combination with a discharge system. Although the present cleaning principle does not generally render necessary the provision of special precautionary steps, it is nevertheless advisable to provide such steps in case materials are unintentionally fed into the container together with those parts which are to be cleaned and which materials will decompose at the temperature of the heat carrier medium which usually does not exceed 350° C. Consequently, a socket pipe is provided above the maximum filling level of the heat carrier medium in the container which socket pipe connects the container with the atmosphere via an activated charcoal filter.

A further improvement is obtained by providing above the maximum filling level of the container a further socket pipe which creates a connection between the container and an excess pressure safety device as well as a protective gas inlet. Finally, according to another feature of the invention, the container is provided with a cooling system in order to shorten the time of the cleaning cycle.

The apparatus according to the invention is especially suitable for use in the cleaning of extrusion screws. In particular when using a tubular container and allowing the supply of the parts to be cleaned from one face end, these parts, in particular extrusion screws, can be easily, economically and quickly charged into the container.

The novel features which are considered characteristic of the invention are set forth in detail in the appended claims. The invention itself, however, both as to its construction and its method of operation, together with other objects and advantages thereof, will appear more clearly from the following specification in connection with the accompanying drawings.

DESCRIPTION OF THE PREFERRED EMBODIMENTS

Figure 1:
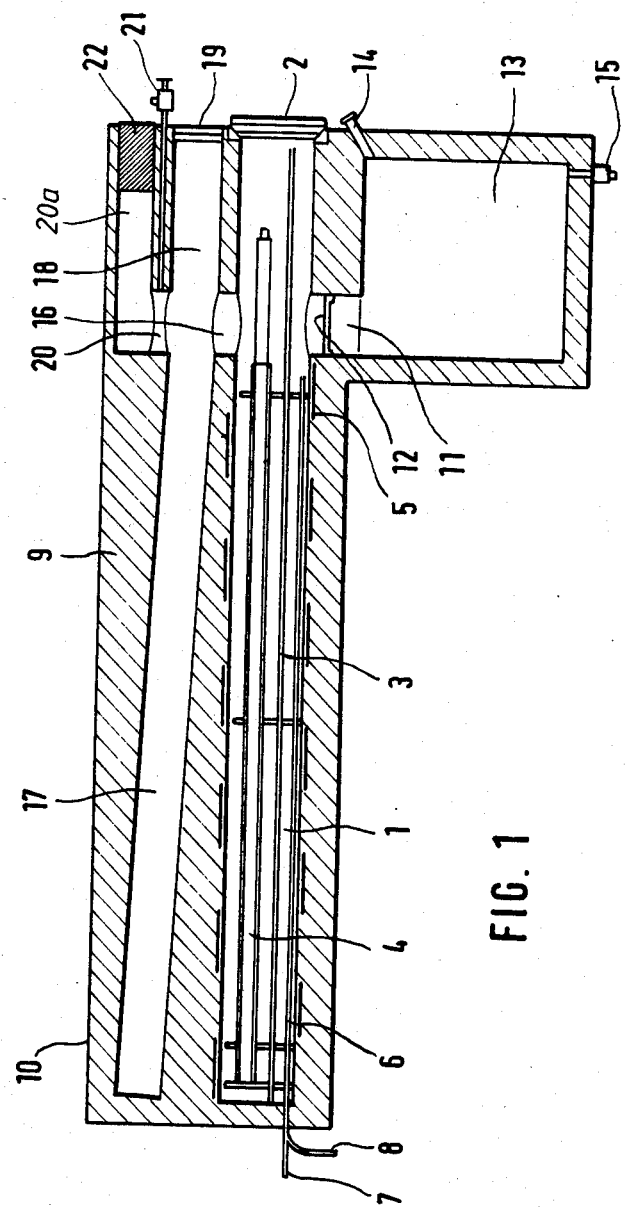
FIG. 1 is a cross-sectional view of essential parts of the apparatus according to the invention.

Referring firstly to FIG. 1, which shows the apparatus in a charging position, there is seen a housing 10 consisting preferably of steel plate which accomodates an inner container 1 whose one end (in FIG. 1 the right hand side) is airtightly closeable by a lid 2. Located within the container is a cage 3 which receives the parts to be cleaned from adhering synthetic residues. In the present example, there is shown a worm 4 of an extrusion screw.

The jacket of the container 1 is preferably made of stainless steel and is surrounded by a heating unit 5. In order to shorten the cleaning cycle which will be described in some detail hereinafter, the container is provided along its major portion with a cooler 6 whose cooling water feed pipe 7 and cooling water discharge pipe 8 project outwardly through the face end 10a of the housing 10 which face end 10a is opposite to the lid 2.

As is seen from FIG. 1, the housing 10 has an inner wall which is lined with a heat insulating material 9. Also, the container 1 as well as all other parts located within the housing 10 are embedded in such a heat insulating material 9.

Connected to the container 1 is a tank 13 whose interior is in communication with the container 1 through a socket pipe 11 which is provided with a filter 12. The tank 13 is arranged at an angle to the container 1, preferably at an angle of 90° and contains a sufficiently temperature stable heat carrier medium when the housing is in the illustrated horizontal position. The heat carrier medium is supplied through an inlet socket 14 and can be discharged through an outlet socket 15, which case is, however, in general not required as the cleaning is effected through a physical process and not through a chemical process, i.e. the synthetic material adhering to the parts is melted and depending on its specific gravity in the operating or vertical position of the housing 10 or container 1 either ascends or sinks down to the bottom. The heat carrier medium is supplied into the tank 13 in an amount corresponding to the useable volume of the container 1 for cleaning of the parts 4.

The apparatus is movable or tiltable around an axis normal to the plane of FIG. 1 from the illustrated horizontal charging position into a vertical operational position, as will be explained hereinbelow with respect to FIGS. 2 and 3. The maximum filling level of the heat carrier medium flowing from the tank 13 into the container 1 upon movement of the housing 10 from the horizontal position to the vertical position is determined by an overflow 16. As can be seen from FIG. 1, the overflow is connected to a tubular overflow reservoir 17 which is inclined with respect to the horizontal or longitudinal axis of the housing 10 in order to permit a complete emptying of the overflow reservoir 17 in the charging position. The overflow 16 is further connected to a pipe 18 which extends parallel to the container 1 along a small portion thereof and whose front end remote to the connection with the overflow 16 is closed by a safety disk 19 to provide a safety arrangement.

As is further shown in FIG. 1, the overflow 16 is also connected to the ambient atmosphere via a socket pipe 20 and a pipe 20a whose front end is provided with an activated charcoal filter 22, and via the socket pipe 20 to a protective gas inlet 21. Through this arrangement any toxic or noxious gases which may be produced are prevented from reaching the environment.

Figure 2:
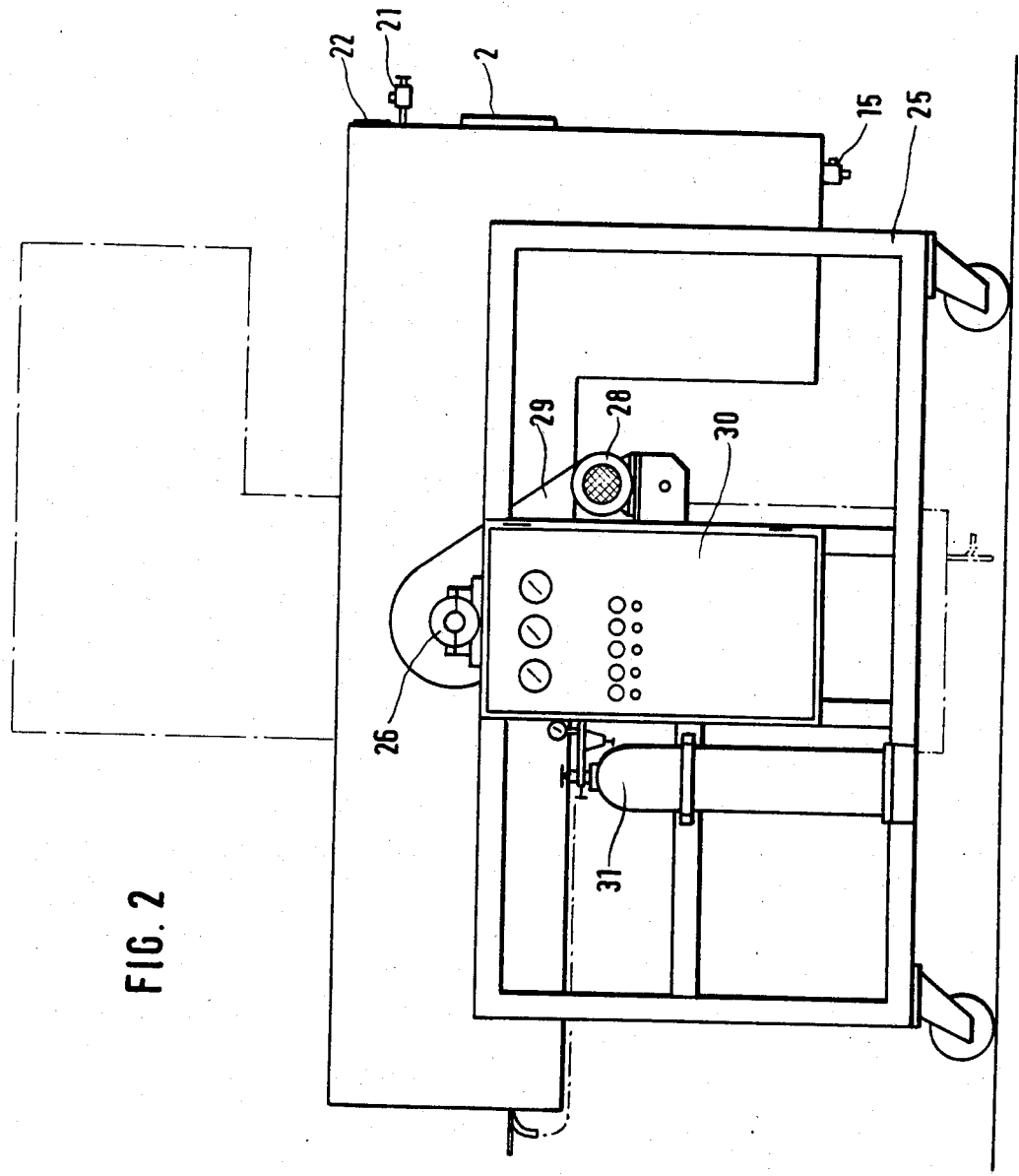
FIG. 2 is a side view of the apparatus mounted on a carriage and illustrating in continuous lines the apparatus in its charging position and in dash-dotted lines the apparatus in its operating position.
Figure 3:
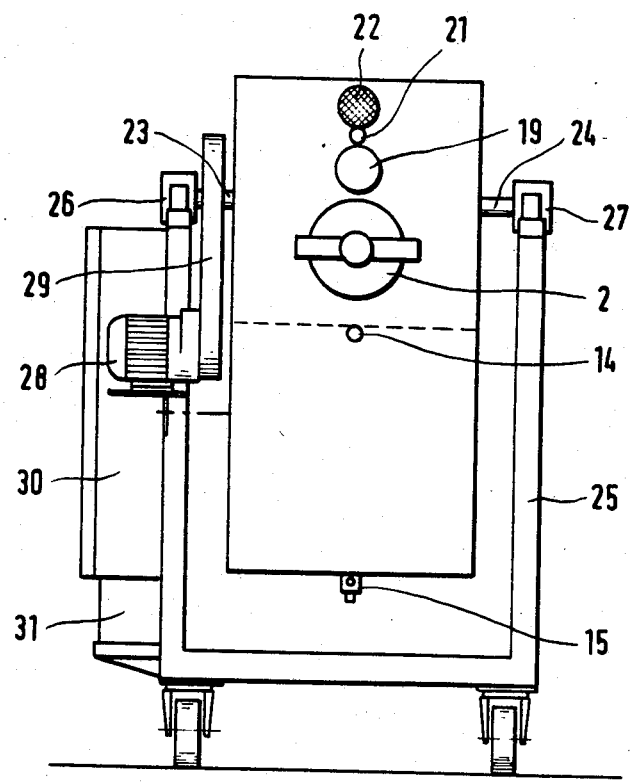
FIG. 3 is a front view of the apparatus according to FIG. 2

Turning now to FIGS. 2 and 3 which show a side view and a front view of the apparatus in a simplified illustration, it is seen that the apparatus is suspended, approximately over its center of gravity, in a carriage 25 by means of pivots 23 and 24 (see FIG. 3) which are engaged in respective bearings 26 and 27 of the carriage 25. To allow the movement of the housing 10 from the horizontal position into the vertical position, the carriage 25 is functionally connected to a motor 28 which is operatively connected, via a transmission 29, to one of the pivots 23 or 24. In the present case, the motor 28 is connected with the pivot 23 (see FIG. 3).

The carriage 25 is further provided with a switch cabinet 30 and a protective gas bottle 31. The tube connections to the cooling water pipes and the protective gas inlet 21 as well as the cable connections to the electrical heating unit 5, to the motor 28 and to auxiliary means, like a feeler gauge, end switches, etc., are not shown.

Having explained the individual parts of the apparatus, the following sets forth the mode of operation of the apparatus:

After having supplied the tank 13 with the appropriate amount of heat carrier medium through inlet socket 14, and after having inserted the parts to be cleaned into container 1, the lid 2 is tightly locked and the motor 28 is started. Consequently, the housing 10, and thus the container 1 as well as the tank 13, is moved from the horizontal position, as illustrated in FIG. 2 with continuous lines, into the vertical position, as shown in FIG. 2 with dash-dotted lines. Through this movement, the heat carrier medium is caused to flow from the tank 13 through the socket pipe 11 into the container 1 so that the cleaning process takes place. The present invention is, of course, in no way restricted to the specific disclosure of the specific action and drawings, but also encompasses any modifications within the scope of the appended claims.

What is claimed is new and desired to be protected by Letters Patent is set forth in the following appended claims:

1. An apparatus for cleaning parts of a processing machine from residues, especially from synthetic residues; comprising:

a housing accommodating a closable inner container for receiving the parts to be cleaned;

a tank connected to the housing at an angle thereto and containing a liquid heatable heat carrier medium;

connecting means for allowing a communication between the tank and the container; and moving means for automatically tilting the housing between a first position in which the container is in an essentially horizontal position and being chargeable with the parts while the heat carrier medium is still within the tank and a second position in which the container extends in an essentially vertical position for allowing the heat carrier medium to automatically flow from the tank into the container to sufficiently fill the latter wherein upon return of the housing from the second position to the first position, the heat carrier medium automatically returns from the container into the tank thereby allowing discharge of the cleaned parts wherein the heat carrier medium flows from the tank into the container up to a maximum filling level upon movement of the housing into the second position, the connection means being arranged above the maximum filling level wherein the housing further accommodates overflow means associated to the container and arranged at the level of the maximum filling level of the heat carrier medium in the container, the housing still further accommodating an overflow reservoir arranged above the container when the housing is in its first position and extending inclined with respect to the container, the overflow means providing a communication between the overflow reservoir and allowing the heat carrier medium to flow from the overflow reservoir directly into the tank when the housing is moved from the first position into the second position.

2. An apparatus as defined in claim 1, wherein the tank is arranged below the container when the housing is in its first position.

3. An apparatus as defined in claim 1, wherein the tank is arranged at a 90° angle with respect to the container.

4. An apparatus as defined in claim 1, wherein the container has at least one front portion for allowing access to the container; and further comprising means for airtightly closing the front portion of the inner container.

5. An apparatus as defined in claim 1, wherein the container is made of stainless steel.

6. An apparatus as defined in claim 1, wherein the connecting means is a socket pipe connecting the interior of the tank with the interior of the container.

7. An apparatus as defined in claim 6, wherein the tank has a portion facing the container, the socket pipe being arranged at an edge of the portion which edge defines the maximum filling level, and having a cross-section of a size which permits air displaced by the heat carrier medium upon movement of the housing into the second position to flow into the tank.

8. An apparatus as defined in claim 1, and further comprising a filter located within the connecting means causing said residues to be deposited thereon.

9. An apparatus as defined in claim 1, wherein the housing further accommodates linking means for connecting the container to the ambient atmosphere, the linking means including a socket pipe located above the maximum filling level of the heat carrier medium in the container and being connected to the latter, an outlet pipe connected to the socket pipe and having a front end remote to the connection of the outlet pipe to the socket pipe which front end provides access to the atmosphere, and an activated charcoal filter located within the front end of the outlet pipe for preventing discharge of toxic and noxious gases into the atmosphere.

10. An apparatus as defined in claim 9, wherein the housing has a front portion and is provided with safety means located above the maximum filling level of the heat carrier medium in the container, the safety means including an inlet for protective gas connectable with the socket pipe allowing entry of protective gas into the container.

11. An apparatus as defined in claim 1, wherein the housing is provided with safety means located above the maximum filling level of the heat carrier medium in the container for allowing relief of excess pressure, said safety means including a pipe connected to the container via the overflow means and extending parallel to the container, the pipe having a front end, and a safety disk connected to the front end for closure thereof.

12. An apparatus as defined in claim 1, and further comprising cooling means for cooling the container, the cooling means being located within the container and extending in the direction of the longitudinal axis along a major portion of the container.

13. An apparatus as defined in claim 1, and further comprising heating means for heating the heat carrier medium to a temperature, the heating means being located along a major portion of the container.

14. An apparatus as defined in claim 1, wherein the container is tubular-shaped and has one front end through which the parts to be cleaned are inserted.

15. An apparatus as defined in claim 1, wherein the housing has an inner wall, the inner wall as well as the container and the tank being lined with and embedded in a heat insulating material.

16. An apparatus as defined in claim 1, wherein the moving means comprises a carriage of U-shape, having shanks parallel to each other and arranged to carry the housing in a suspending manner via respective pivots; a motor-transmission unit functionally connected to at least one of the pivots via a transmission for moving the housing between said first and second positions; and a switch cabinet controlling said motor-transmission unit.

* * * * *